(12) United States Patent
Adamczak et al.

(10) Patent No.: US 11,353,073 B2
(45) Date of Patent: Jun. 7, 2022

(54) BRAKE PAD FOR A DISK BRAKE ASSEMBLY, COMPRISING A SUCTION GROOVE IN A FRONT REGION AND A CHAMFERED FRONT REGION

(71) Applicant: TALLANO TECHNOLOGIE, Boulogne Billancourt (FR)

(72) Inventors: Loïc Adamczak, Montalieu Vercieu (FR); Adrien Maistre, Vincennes (FR)

(73) Assignee: TALLANO TECHNOLOGIE, Boulogne Billancourt (FR)

(*) Notice: Subject to any disclaimer, the term of this patent is extended or adjusted under 35 U.S.C. 154(b) by 0 days.

(21) Appl. No.: 16/963,150

(22) PCT Filed: Jan. 11, 2019

(86) PCT No.: PCT/FR2019/050061
§ 371 (c)(1),
(2) Date: Jul. 17, 2020

(87) PCT Pub. No.: WO2019/141926
PCT Pub. Date: Jul. 25, 2019

(65) Prior Publication Data
US 2020/0340541 A1 Oct. 29, 2020

(30) Foreign Application Priority Data
Jan. 17, 2018 (FR) ...................................... 18 50381

(51) Int. Cl.
*F16D 65/00* (2006.01)
*B60T 1/06* (2006.01)
(Continued)

(52) U.S. Cl.
CPC .......... *F16D 65/0031* (2013.01); *B60T 1/065* (2013.01); *F16D 55/22* (2013.01);
(Continued)

(58) Field of Classification Search
CPC .... F16D 65/0031; F16D 65/092; F16D 69/00; F16D 55/22; F16D 2200/0004; F16D 2069/004; B60T 1/065
See application file for complete search history.

(56) References Cited

U.S. PATENT DOCUMENTS 5,162,053 A 11/1992 Kowalski, Jr.
5,443,133 A 8/1995 Dreilich et al.
(Continued)

FOREIGN PATENT DOCUMENTS

CN 206206449 U * 5/2017
CN 112922983 A * 6/2021
(Continued)

OTHER PUBLICATIONS

International Search Report for PCT/FR2019/050061 dated Apr. 1, 2019, 7 pages with English Translation.
(Continued)

*Primary Examiner* — Pamela Rodriguez
(74) *Attorney, Agent, or Firm* — Nixon & Vanderhye

(57) ABSTRACT

The brake pad (10A, 10B) comprises a lining (22) made of friction material and a plate (20) supporting the lining (22). The lining (22) comprises: —a rear edge (34) located on the side where the disk (9) is able to come out of an interface with the pad (10A, 10B) when the disk (9) rotates in an direction of travel of the vehicle, and a front edge (36); —a collection groove (3) that opens into the friction face (30) and is located close to the rear edge (34). The lining (22) has a rear region (60) comprising the rear edge (34) and the collection groove (3), and a front region (62) comprising the front edge (36), the front region (62) having a chamfered portion (66) such that an area of a friction surface of the front region (62) increases when a thickness of the front region (62) decreases.

19 Claims, 3 Drawing Sheets

(51) Int. Cl.
*F16D 55/22* (2006.01)
*F16D 65/092* (2006.01)
*F16D 69/00* (2006.01)

(52) U.S. Cl.
CPC .......... *F16D 65/092* (2013.01); *F16D 69/00* (2013.01); *F16D 2069/004* (2013.01)

(56) References Cited

U.S. PATENT DOCUMENTS

| | | |
|---|---|---|
| 2002/0000349 A1 | 1/2002 | Brecht et al. |
| 2008/0029357 A1 | 2/2008 | Krantz |
| 2011/0290599 A1 | 12/2011 | Vasel |
| 2015/0001013 A1 | 1/2015 | Mennie |
| 2021/0033157 A1* | 2/2021 | Vyletel ................ F16D 65/0031 |

FOREIGN PATENT DOCUMENTS

| | | |
|---|---|---|
| DE | 198 46 887 | 4/2000 |
| EP | 1 369 199 | 12/2003 |
| EP | 2 725 255 | 4/2014 |
| FR | 3 034 831 | 10/2016 |
| GB | 2533476 | 6/2016 |
| JP | 2013-144585 | 7/2013 |
| WO | 2008/049829 A1 | 5/2008 |

OTHER PUBLICATIONS

Written Opinion of the ISA for PCT/FR2019/050061 dated Apr. 1, 2019, 12 pages with English Translation.

* cited by examiner

BRAKE PAD FOR A DISK BRAKE ASSEMBLY, COMPRISING A SUCTION GROOVE IN A FRONT REGION AND A CHAMFERED FRONT REGION

This application is the U.S. national phase of International Application No. PCT/FR2019/050061 filed Jan. 11, 2019 which designated the U.S. and claims priority to FR Patent Application No. 18 50381 filed Jan. 17, 2018, the entire contents of each of which are hereby incorporated by reference.

FIELD OF THE INVENTION

The present invention relates to vehicles, in particular motor vehicles and also to railway rolling stock. More specifically, the invention relates to the braking of vehicles and of railway rolling stock. The invention further relates to the brake pads for disk brake assemblies for these vehicles and these railway rolling stock.

It should be noted that, according to the invention, the vehicle can be of any type and can in particular be a car, a lorry or a bus. Similarly, the railway rolling stock can be a train, a tramway or even a metro.

BACKGROUND OF THE INVENTION

A vehicle or a railway rolling stock generally comprises a braking system. The braking system can in particular be a disk brake system. The braking system thus includes a disk, integral with a wheel or with an axle of the vehicle or of the railway rolling stock. Thus, when the wheel, or the axle, is set in rotation to allow the vehicle or the railway rolling stock to move, the disk is also set in rotation.

Thus, in order to brake the vehicle or the railway rolling stock, the disk brake system comprises disk friction means. The friction means in particular include two plates each of which bear a lining which comprises a friction material. The friction material is configured such that it comes into contact with the disk. The two plates bearing the friction linings are disposed on either side of the disk so as to sandwich same therebetween when the braking system is actuated.

However, when the friction material comes into contact with the disk when the latter is rotating, the friction material emits particles that are harmful to human health and the environment. The braking systems are thus polluting.

This is why a suction device is known to be arranged to aspirate the particles generated by the braking in the braking system. The suction device is intended to aspirate the braking particles shortly after the emission thereof.

However, the suction device is mainly designed to operate when the brake pad is in a "factory" configuration. Thus, during the use thereof, the aspiration of the braking particles can become less efficient.

PURPOSE OF THE INVENTION

One purpose of the invention is to provide a brake pad for a disk brake assembly, the performance levels whereof remain constant over time.

SUMMARY OF THE INVENTION

For this purpose, the invention provides for a brake pad for a disk brake assembly, comprising a lining made of friction material and a plate supporting the lining, wherein:
the lining comprises:
a friction face and a fastening face,
a rear edge located on the side where the disk is able to come out of an interface with the pad when the disk rotates in a direction of forwards travel of the vehicle, and a front edge,
an inner edge and an outer edge, and
a collection groove that opens into the friction face and is arranged close to the rear edge, the collection groove opening out onto one of either the inner or outer edges,
the plate including a hole in fluid communication with the collection groove, the hole being connected to a source of negative pressure via communication means,
characterized in that the lining includes a rear region including the rear edge and the collection groove, and a front region including the front edge, the front region including a chamfered portion such that an area of a friction surface of the front region increases as a thickness of the front region decreases.

Thus, the chamfered portion of the front region allows the braking function to be optimally run in. Moreover, braking particle capture is all the more efficient the closer the collection groove is to the rear edge and the larger an area of a friction surface disposed between the collection groove and the front edge. Moreover, the presence of the chamfered portion on the front region allows the center of mass of the lining to be moved towards the front region. Thus, when a pressure is exerted on the plate supporting the lining to impose contact between the lining and the disk, the front region will become worn more quickly, which will result in an increase of the area of the friction surface of the front region. As a result, the area of the friction surface disposed between the collection groove and the front edge increases as the material is worn. Moreover, the absence of any chamfer, or the provision of a reduced chamfer near the rear region ensures that the collection efficiency of the braking particles is thus retained, or at least decreases very little over time.

Furthermore, the chamfered portion disposed in the front region procures a less violent contact between the lining and the disk. The brake pad thus has improved acoustic performance levels, the noise produced during braking being reduced.

Furthermore, in various embodiments of the invention, one and/or the other of the following provisions can also be implemented:
the rear region comprises a chamfered portion such that an area of a friction surface of the rear region increases as a thickness of the rear region decreases such that, for the same decrease in thickness, the area of the friction surface of the rear region increases relatively less than the area of the friction surface of the front region; of course, it should be noted that the term "relatively less" is understood to mean that it is possible that the area of the friction surface of the rear region does not increase at all as the thickness of the rear region decreases;
an area of the chamfered portion of the rear region is smaller than an area of the chamfered portion of the front region; the chamfered portions are thus asymmetric, the brake pad is thus optimally shaped;
the chamfered portions of the front and rear regions are planar, an angle formed between the chamfered portion of the rear region and a plane comprising the fastening face is greater than an angle formed between the chamfered portion of the front region and the plane comprising the fastening face;

the chamfered portion of the rear region includes an outer border and an inner border, the inner border having a relatively shorter length than a length of the outer border;

the chamfered portion of the front region includes an outer border and an inner border, the inner border having a relatively shorter length than a length of the outer border;

the rear region includes two walls, one whereof bears a friction surface of the rear region, the two walls comprising a common rim and substantially forming a right angle therebetween;

the collection groove is disposed at a distance from the rear edge of less than 10 millimeters;

the collection groove is directly hollowed out of the friction material, as far as the surface of the plate;

the collection groove extends between an open end and a blind end, the hole of the plate opening out into the collection groove close to the blind end.

According to the invention, a disk brake assembly is also provided, including a disk and two brake pads as described hereinabove and disposed on either side of the disk.

Finally, according to the invention, a disk brake system is provided, comprising a disk brake assembly as described hereinabove and wherein the disk is integral with an axle or with a wheel.

BRIEF DESCRIPTION OF THE FIGURES

One embodiment of the invention will now be described, as a non-limiting example, with reference to the following figures.

DETAILED DESCRIPTION OF ONE EMBODIMENT OF THE INVENTION

It should be noted that, for clarity purposes, only elements beneficial for understanding the embodiments described have been shown and will be described.

Moreover, unless specified otherwise, the expressions "substantially" and "about", etc. mean that a slight variation from the nominal value considered is possible, in particular of a low percentage, in particular to the nearest 10%.

Figure 1:
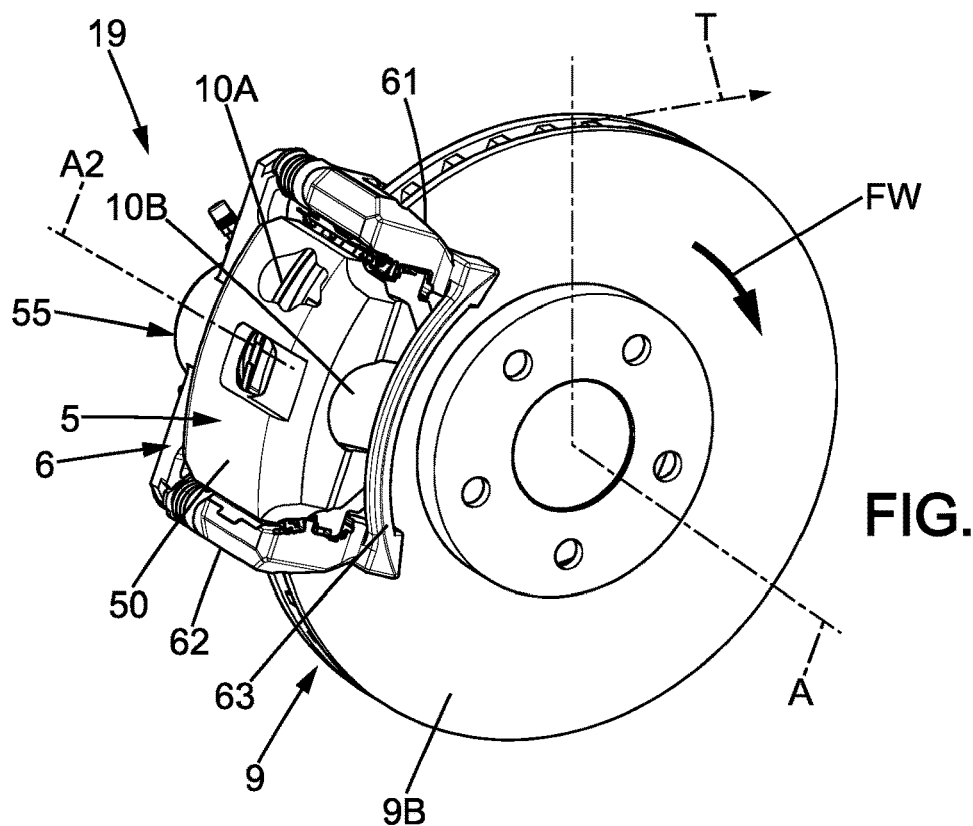
FIG. 1 shows a perspective view of a disk brake system according to one embodiment of the invention.
Figure 2:
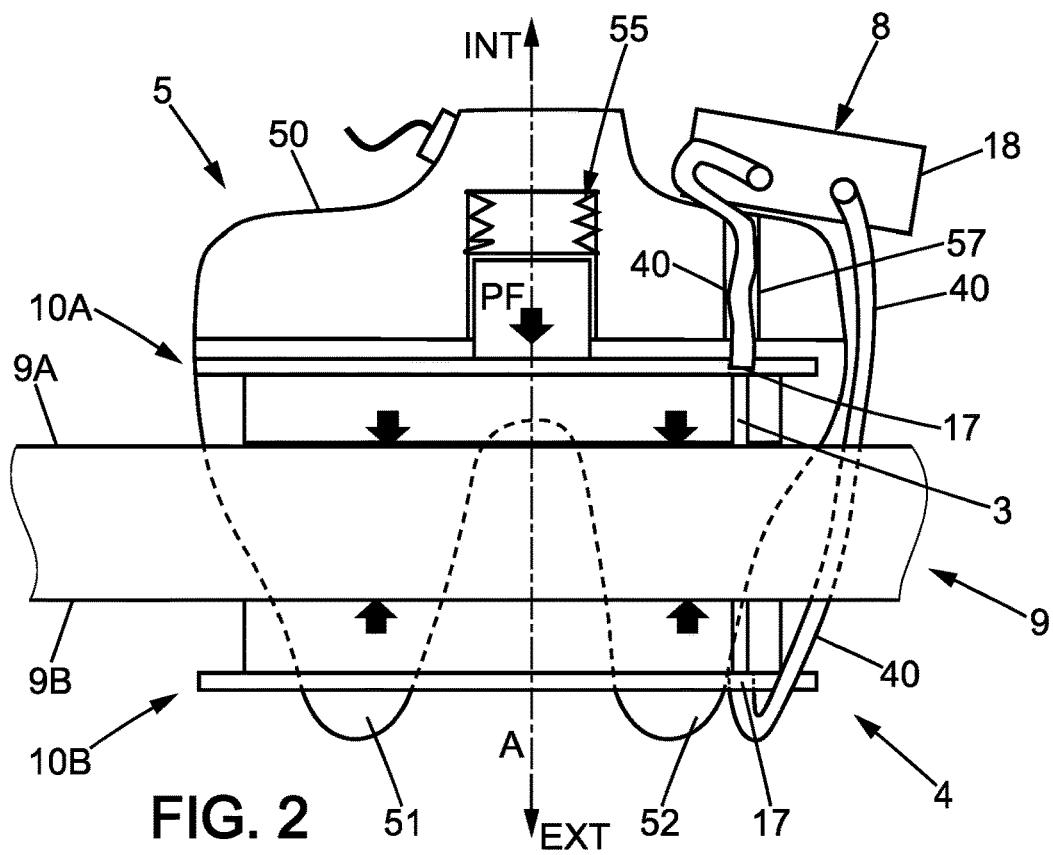
FIG. 2 shows this disk brake system, viewed from an axis perpendicular to a main plane of a disk of the disk brake system.

FIGS. 1 and 2 show a disk brake system 19 according to the invention for a vehicle. In this embodiment, the vehicle is a motor vehicle, in this case a light vehicle. It should however be noted that the invention can be implemented for any type of vehicle, such as a tractor for a semi-trailer, a bus or an agricultural tractor, or for any type of railway rolling stock, such as a locomotive or a railway car.

The disk brake system 19 according to the invention includes a disk 9 of axis A, integral with a wheel of the vehicle. The disk 9 has a side face 9A and an opposite side face 9B. The side faces 9A, 9B are perpendicular to the axis A. The disk 9 is also connected to a transmission mechanism, in particular by way of a hub, itself connected to an engine of the vehicle. Thus, the transmission mechanism allows a rotational movement about the axis A to be transmitted to the wheel of the vehicle, by way of the disk 9, in order to displace the vehicle.

Furthermore, the disk brake system 19 includes a caliper 5 which surrounds in a sandwich grip, a portion of the disk 9. As shown in particular in FIG. 2, the caliper 5 takes the form of a main body 50 which has an overall U shape so as to surround the disk 9. Moreover, the main body 50 includes a cavity for housing a piston 55. The caliper 5 further includes two fingers 51, 52. The piston 55 is capable of exerting a force PF in a direction A2 shown in FIG. 1 and which is parallel to the axis A of the disk.

FIG. 1 shows a direction of rotation FW of the disk 9 which corresponds to a forward travel of the vehicle. A tangential direction T to the disk 9 is also shown.

Moreover, for the disk brake system 19, a rear side and an opposite front side are defined. The rear side corresponds to the side where the disk 9 comes out of the interface with the caliper 5 when the disk 9 rotates in the direction of forwards travel of the vehicle. The front side is the opposite side and corresponds to the side where the disk 9 enters the interface with the caliper 5 when the disk 9 rotates in the direction of forwards travel of the vehicle. Moreover, for a radial direction extending from the axis A to the circumference of the disk 9, a direction is defined that extends from the interior outwards.

The disk brake system 19 comprises a caliper holder 6 which is fastened to a member of the vehicle. This member can in particular be a control arm of the vehicle. Moreover, the caliper holder 6 comprises two bridges 61, 62 disposed at two longitudinal ends of the caliper 5 and a connecting arch 63 which connects the two bridges 61, 62. The bridge 61 is a rear bridge and the bridge 62 is a front bridge.

The disk brake system 19 further includes two brake pads 10A, 10B housed inside the caliper 5. The two brake pads 10A, 10B are disposed on either side of the disk 9. The brake pad 10A is disposed facing the side face 9A of the disk 9. The brake pad 10B is disposed facing the side face 9B of the disk 9. Thus, the two brake pads 10A, 10B are disposed symmetrically relative to a plane including the disk 9 and perpendicular to the axis A of the disk 9.

The piston 55 of the caliper 5 is arranged so as to exert the force PF on the brake pad 10A such that the two pads 10A, 10B come into contact with the disk 9 so as to brake the vehicle when the disk brake system 19 is actuated by a driver of the vehicle. It should be noted that, in the example shown, the caliper 5 is mounted such that it "floats" in the caliper holder 6, along the axis A. Thus, the caliper 5 can move parallel to the axis A, in particular to compensate for the gradual wear of the pads 10A, 10B. However, the caliper 5 is held integral with the caliper holder 6 in the other potential translational and rotational movements. The floating mounting is usually procured using columns sliding along the axis A.

The brake pad 10A will now be described in more detail. Given the symmetry effects, the following description is also valid for the brake pad 10B.

Figure 3:
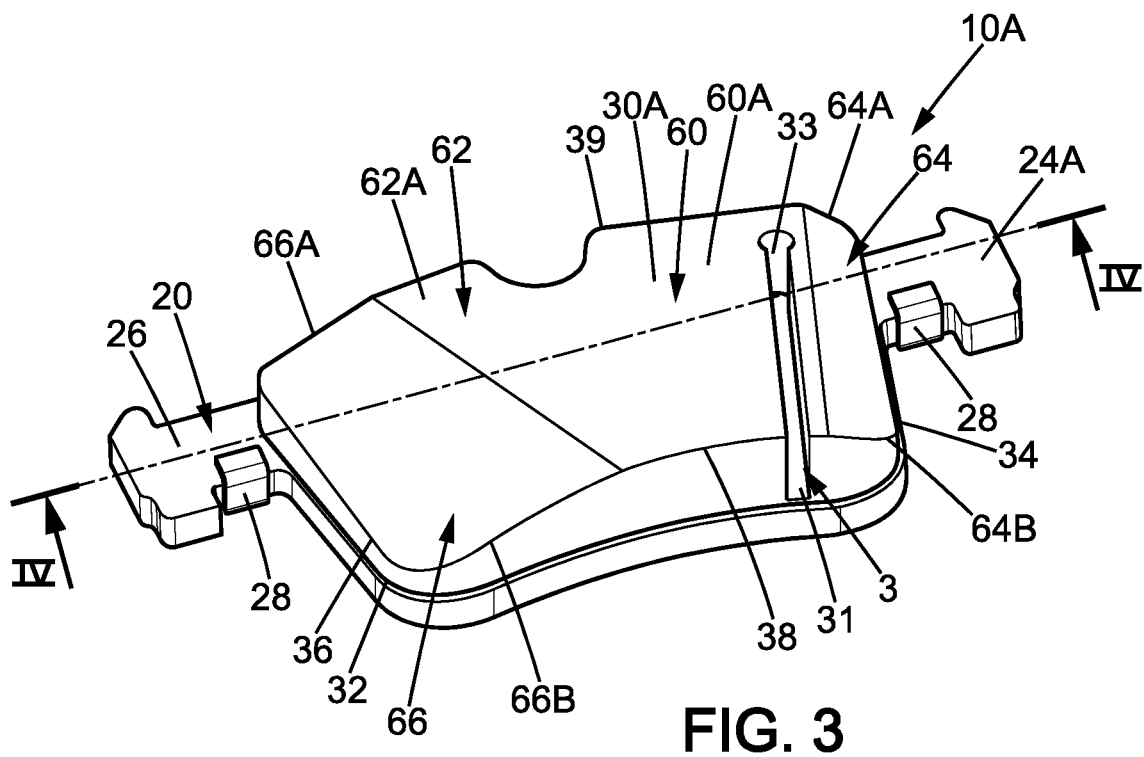
FIG. 3 shows a perspective view of a brake pad of the disk brake system.
Figure 4:
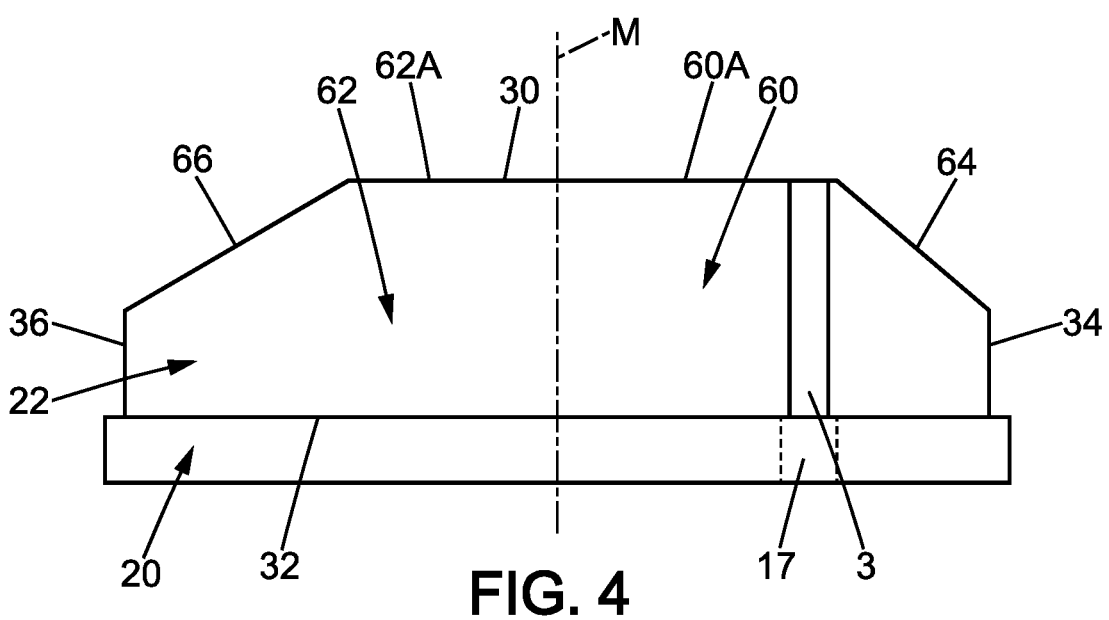
FIG. 4 shows a sectional view, along the IV-IV plane identified in FIG. 3, of the brake pad.

The pad 10A is in particular shown in FIGS. 3 and 4. Thus, the brake pad 10A comprises a plate 20 bearing a friction lining 22. The plate 20 takes the form of a solid metal plate with a substantially constant thickness. The plate 20 includes a rear arm 24 and a front arm 26 which allow the plate 20 to be fastened to the main body 55 of the caliper 5 using hooks 28. The plate 20 includes a fastening face to which the friction lining 22 is fastened. The face opposite the fastening face is fastened to the piston 55 as shown in FIG. 2.

The friction lining 22 takes the form of a body made of friction material capable of coming into contact with the side face 9A of the disk 9 in order to brake the vehicle. The friction material is known as "ferodo." The friction lining 22 thus includes a friction face 30 intended to come into direct contact with the side face 9A of the disk 9. The friction lining 22 further includes a fastening face 32, opposite the friction face 30, and directly fastened to the fastening face of the plate 20. Moreover, with reference to the aforementioned sides, the friction lining 22 includes a rear edge 34 and an opposite front edge 36. The friction lining 22 further includes an inner edge 38 and an outer edge 39.

When the disk brake system 19 is actuated, the contact between the friction face 30 of the friction lining 22 of the brake pad 10A and the side face 9A of the disk 9 generates the emission of polluting braking particles. These braking particles correspond to particles of the friction material which become detached from the friction lining 22 by abrasion with the side face 9A of the disk 9 and also to particles which detach from the disk 9. This is why the disk brake system 19 includes means for aspirating the braking particles described hereinbelow.

The friction lining 22 includes a collection groove 3. The collection groove 3 opens into the friction face 30 and is arranged close to the rear edge 34 of the friction lining 22. Thus, when the vehicle is travelling forwards, the braking particles are driven towards the collection groove 3, which improves the collection efficiency. Preferably, the collection groove 3 is disposed at a maximum distance from the rear edge 34 of the friction lining 22 that is substantially less than 10 millimeters, or 8 millimeters, or 6 millimeters or 3 millimeters.

When the vehicle is braked while travelling forwards, the braking particles are emitted forwards FW, with reference to the forward travel of the vehicle. Thus, the capture of the braking particles is all the more efficient the closer the collection groove 3 is to a rear border of a portion of the friction face 30 which is directly in contact with the side face 9A of the disk 9.

As shown in FIG. 2, the collection groove 3 is a single, continuous groove. It has a constant width. Moreover, the collection groove 3 is directly hollowed out of the friction material as far as the plate 20. Furthermore, the collection groove 3 mainly extends in a direction substantially parallel to a direction extending from the interior to the exterior of the friction lining 22. Similarly, the collection groove 3 is substantially parallel to the rear edge 34 of the friction lining 22.

The collection groove 3 further extends between an open end 31 and a blind end 33. The open end 31 is disposed on the inner edge 38 of the friction lining 22. The blind end 33 is disposed close to the outer edge 39. It goes without saying that the open end 31 can also be disposed on the outer edge 39 of the friction lining 22. The blind end 33 can also be disposed close to the inner edge 38 of the friction lining 22.

The plate 20 includes a hole 17 that opens out into the collection groove 3.

The hole 17 is substantially facing the blind end 33. The hole 17 can be more generally disposed close to the blind end 33. The hole 17 is also in pneumatic communication with the collection groove 3.

Furthermore, as shown in FIG. 2, the disk brake system 19 includes a suction device 8 in pneumatic communication with the hole 17 by means of a flexible hose 40 which passes through the main body 50 of the caliper 5. The suction device 8 includes a source of negative pressure, for example a turbine, and a filter allowing the aspirated air loaded with braking particles to be filtered. The source of negative pressure is configured such that it aspirates from the collection groove 3.

Thus, the hole 17 is connected to a source of negative pressure via communication means which, in this case, include the flexible hose 40.

Moreover, the friction lining 22 includes a rear region 60 and a front region 62. The rear region 60 includes the rear edge 34 of the friction lining 22 and the collection groove 3. The front region 62 includes the front edge 36. The rear region 60 and the front region 62 are disposed one after the other and are in contact with one another. They each occupy substantially half of the friction lining 22. FIG. 4 shows an axis M which delimits the boundary between the rear region 60 and the front region 62.

The rear region 60 includes a friction surface 60A which is a surface capable of directly coming into contact with the side face 9A of the disk 9. Similarly, the front region 62 includes a friction surface 62A which is a surface capable of directly coming into contact with the side face 9A of the disk 9.

The rear region 60 includes a chamfered portion 64 which connects the friction surface 60A of the rear region 60 and the rear edge 34 of the friction lining 22 such that a thickness of the friction lining 22 is greater at a portion that includes the friction surface 60A than at a portion that comprises the rear edge 34. Thus, when the thickness of the rear region 60 decreases, in particular due to the wear caused by the use of the brake pad 10A, an area of the friction surface 60A of the rear region 60 increases.

Similarly, the front region 62 includes a chamfered portion 66 which connects the friction surface 62A of the front region 62 and the front edge 36 of the friction lining 22 such that a thickness of the friction lining 22 is greater at a portion that includes the friction surface 62A than at a portion that comprises the front edge 36. Thus, when the thickness of the front region 62 decreases, in particular due to the wear caused by the use of the brake pad 10A, an area of the friction surface 62A of the front region 62 increases.

However, as shown in FIGS. 3 and 4, an area of the chamfered portion 64 of the rear region 60 is smaller than an area of the chamfered portion 66 of the front region 62. Thus, as shown in particular in FIG. 4, for the same decrease in maximum thickness, corresponding to the disappearance of the chamfered portions 64, 66, the area of the friction surface 60A of the rear region 60 increases relatively less than the area of the friction surface 62A of the front region 62.

The rear region 60 is thus "less chamfered" than the front region 62. Thus, with the wear of the friction lining 22, the area of the friction surface 60A will increase to a greater extent. Thus, more braking particles will be emitted from the front region 62 backwards. The capture efficiency of the braking particles is thus maintained over time.

Moreover, since the area of the chamfered portion 64 of the rear region 60 is less than the area of the chamfered portion 66 of the front region 62, the center of mass of the friction lining 22 is closer to the rear edge 34 than to the front edge 36.

Thus, since the application of the force PF of the piston 55 takes place substantially between the rear edge 34 and the front edge 36, the chamfered portion 66 of the front region 62 tends to become worn more quickly than the chamfered portion 64 of the rear region 60, which also results in the emission of more braking particles upstream of the collection groove 3.

The chamfered portions 64, 66 respectively of the rear region 60 and of the front region 62 also have the property of allowing a less violent contact between the side face 9A of the disk 9 and the friction lining 22. Thus, the noise and the vibrations generated during braking are reduced. Moreover, the chamfered portions 64, 66 form ramps for evacuating water, for example originating from precipitations.

Furthermore, as shown in FIG. 3, the chamfered portion 64 of the rear region 60 includes an inner border 64A and an outer border 64B which are respectively partially aligned with the inner edge 38 and outer edge 39 of the friction lining 22. The inner border 64A has a relatively shorter length than the outer border 64B.

Similarly, the chamfered portion 66 of the front region 62 includes an inner border 66A and an outer border 66B which are respectively partially aligned with the inner edge 38 and outer edge 39 of the friction lining 22. The inner border 66A has a relatively shorter length than the outer border 66B.

Figure 5:
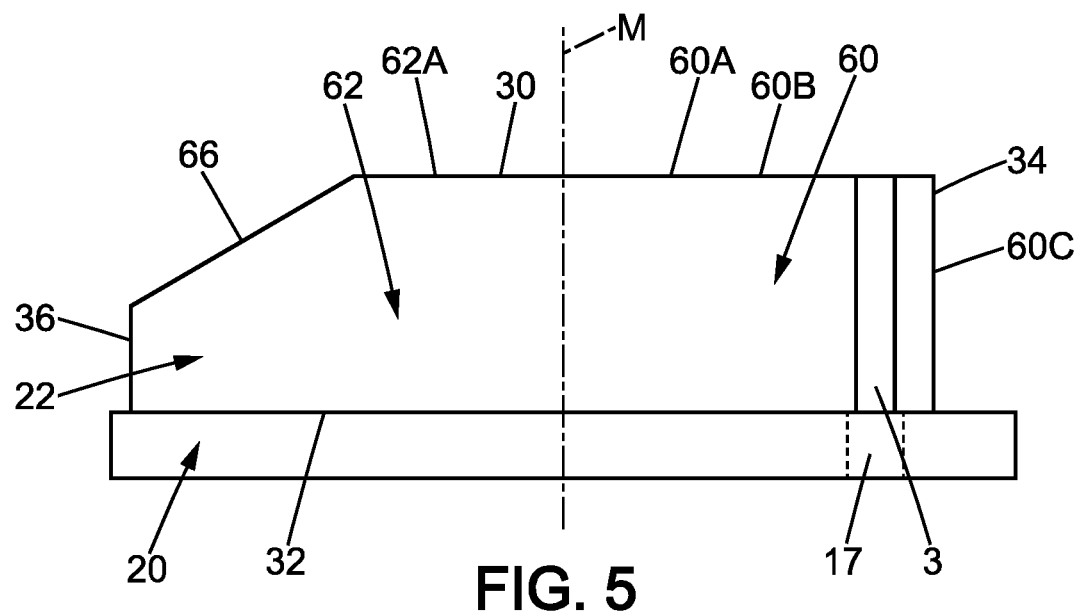
FIG. 5 shows, along this same cutting plane, a pad according to an alternative embodiment of the invention.
Figure 6:
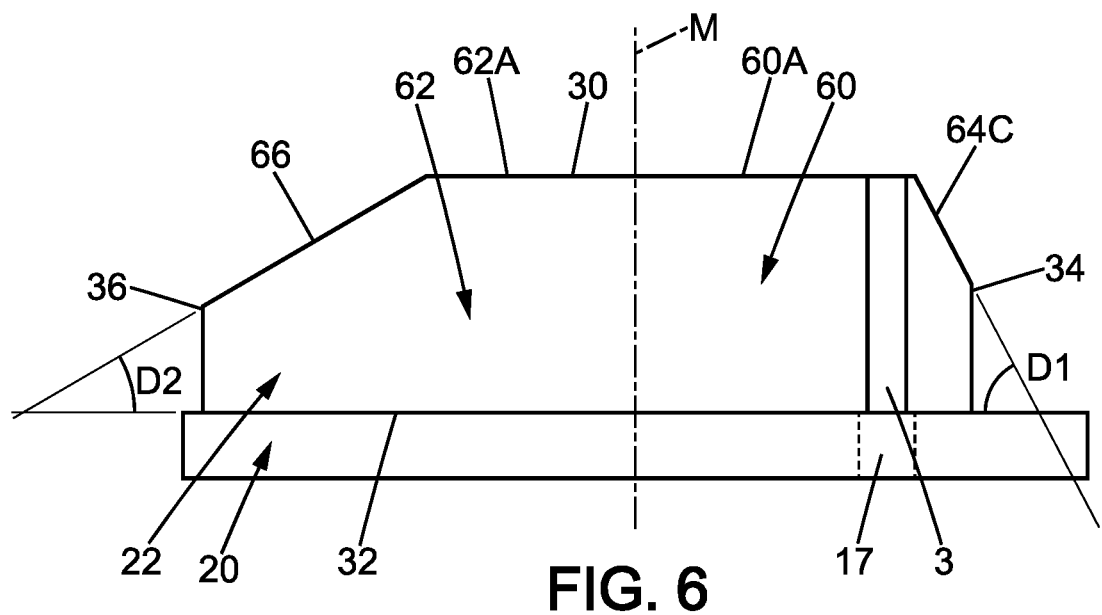
FIG. 6 shows, along this same cutting plane, a pad according to another alternative embodiment of the invention.

FIGS. 5 and 6 show two alternative embodiments to the present embodiment. Only the differences with the present embodiment will be described.

According to the alternative embodiment shown in FIG. 5, the rear region 60 does not include the chamfered portion 64. Thus, throughout the life of the brake pad 10A, the collection groove 3 remains close to the rear edge 34 of the friction lining 22. The rear region 60 thus includes two walls 60B, 60C. The wall 60B bears the friction surface 60A of the rear region 60. Moreover, the wall 60C is disposed perpendicularly to the wall 60B and connects the wall 60B to the plate 20. Furthermore, the walls 60B and 60C include a common rim which is, in this case, the rear edge 34.

According to the alternative embodiment shown in FIG. 6, the chamfered portion 64C of the rear region 60 is planar and defines an angle D1 with a plane that includes the plate 20. The angle D1 is defined by the intersection between the continuation of the chamfered portion 64C and the plane that comprises the fastening face 32. Similarly, the chamfered portion 66 is planar and defines an angle D2 with the plane that includes the plate 20. The angle D2 is also defined by the intersection between the continuation of the chamfered portion 66 and the plane that comprises the fastening face 32. According to this alternative embodiment, D1 is greater than D2. The chamfered portion 64C of the rear region 60 is thus "more sloped" than the chamfered portion 66 of the front region 62. The technical effect described hereinabove is thus also obtained.

It goes without saying that numerous modifications can be made to the invention, while still remaining within the scope thereof.

In particular, any type of source of negative pressure, or more generally any type of suction means could be used.

Any type of material could also be used for the friction lining 22.

The invention claimed is:

1. Brake pad (10A, 10B) for a disk brake assembly (9), comprising a lining (22) made of friction material and a plate (20) supporting the lining (22), wherein:
   the lining (22) comprises:
      a friction face (30) and a fastening face (32),
      a rear edge (34) located on the side where the disk (9) is able to come out of an interface with the pad (10A, 10B) when the disk (9) rotates in a direction of forwards travel of the vehicle, and a front edge (36),
      an inner edge (38) and an outer edge (39), and
      a collection groove (3) that opens into the friction face (30) and is arranged close to the rear edge (34), the collection groove (3) opening out onto one of either the inner edge (38) or the outer edge (39),
   the plate (20) including a hole (17) in fluid communication with the collection groove (3), the hole (17) being connected to a source of negative pressure via communication means (40),
   wherein the collection groove (3) extends between an open end (31) and a blind end (33), the hole (17) of the plate (20) opening out into the collection groove (3) close to the blind end (33), and
   wherein the lining (22) includes a rear region (60) including the rear edge (34) and the collection groove (3), and a front region (62) including the front edge (36), the front region (62) including a chamfered portion (66) such that an area of a friction surface of the front region (62) increases as a thickness of the front region (62) decreases.

2. The brake pad (10A, 10B) according to claim 1, wherein the rear region (60) comprises a chamfered portion (64) such that an area of a friction surface of the rear region (60) increases as a thickness of the rear region (60) decreases such that, for the same decrease in thickness, the area of the friction surface of the rear region (60) increases relatively less than the area of the friction surface of the front region (62).

3. The brake pad (10A, 10B) according to claim 2, wherein an area of the chamfered portion (64) of the rear region (60) is smaller than an area of the chamfered portion (66) of the front region (62).

4. The brake pad (10A, 10B) according to claim 3, wherein the chamfered portions (64, 66) of the rear region (60) and front region (62) are planar, an angle (Dl) formed between the chamfered portion (64) of the rear region (60) and a plane comprising the fastening face is greater than an angle (D2) formed between the chamfered portion (66) of the front region (62) and the plane comprising the fastening face (32).

5. The brake pad (10A, 10B) according to claim 3, wherein the chamfered portion (64) of the rear region (60) includes an outer border (64A) and an inner border (64B), the inner border (64B) having a relatively shorter length than a length of the outer border (64A).

6. The brake pad (10A, 10B) according to claim 3, wherein the chamfered portion (66) of the front region (62) includes an outer border (66A) and an inner border (66B), the inner border (66B) having a relatively shorter length than a length of the outer border (66A).

7. The brake pad (10A, 10B) according to claim 2, wherein the chamfered portions (64, 66) of the rear region (60) and front region (62) are planar, an angle (Dl) formed between the chamfered portion (64) of the rear region (60) and a plane comprising the fastening face is greater than an angle (D2) formed between the chamfered portion (66) of the front region (62) and the plane comprising the fastening face (32).

8. The brake pad (10A, 10B) according to claim 7, wherein the chamfered portion (64) of the rear region (60) includes an outer border (64A) and an inner border (64B), the inner border (64B) having a relatively shorter length than a length of the outer border (64A).

9. The brake pad (10A, 10B) according to claim 7, wherein the chamfered portion (66) of the front region (62) includes an outer border (66A) and an inner border (66B), the inner border (66B) having a relatively shorter length than a length of the outer border (66A).

10. The brake pad (10A, 10B) according to claim 2, wherein the chamfered portion (64) of the rear region (60) includes an outer border (64A) and an inner border (64B), the inner border (64B) having a relatively shorter length than a length of the outer border (64A).

11. The brake pad (10A, 10B) according to claim 10, wherein the chamfered portion (66) of the front region (62) includes an outer border (66A) and an inner border (66B), the inner border (66B) having a relatively shorter length than a length of the outer border (66A).

12. The brake pad (10A, 10B) according to claim 2, wherein the chamfered portion (66) of the front region (62) includes an outer border (66A) and an inner border (66B), the inner border (66B) having a relatively shorter length than a length of the outer border (66A).

13. The brake pad (10A, 10B) according to claim 2, wherein the collection groove (3) is disposed at a distance from the rear edge (34) of less than 10 millimeters.

14. The brake pad (10A, 10B) according to claim 1, wherein the chamfered portion (66) of the front region (62) includes an outer border (66A) and an inner border (66B), the inner border (66B) having a relatively shorter length than a length of the outer border (66A).

15. The brake pad (10A, 10B) according to claim 1, wherein the rear region (60) includes two walls (60B, 60C), one (60B) whereof bears a friction surface of the rear region (60), the two walls (60B, 60C) comprising a common rim (34) and substantially forming a right angle therebetween.

16. The brake pad (10A, 10B) according to claim 1, wherein the collection groove (3) is disposed at a distance from the rear edge (34) of less than 10 millimeters.

17. The brake pad (10A, 10B) according to claim 1, wherein the collection groove (3) is directly hollowed out of the friction material, as far as the surface of the plate (20).

18. Disk brake assembly including a disk (9) and two brake pads (10A, 10B) according to claim 1, disposed on either side of the disk (9).

19. Disk brake system (19) comprising a disk (9) brake assembly according to claim 18, wherein the disk (9) is integral with an axle or with a wheel.

* * * * *